United States Patent

Howard et al.

[11] Patent Number: 5,093,197
[45] Date of Patent: Mar. 3, 1992

[54] MICROPOROUS FILAMENTS AND FIBERS

[75] Inventors: Robert E. Howard; James Young, both of Corvallis, Oreg.

[73] Assignee: ENTEK Manufacturing Inc., Lebanon, Oreg.

[21] Appl. No.: 718,447

[22] Filed: Jun. 20, 1991

Related U.S. Application Data

[63] Continuation of Ser. No. 368,656, Jun. 20, 1989, abandoned, and a continuation-in-part of Ser. No. 135,240, Dec. 21, 1987, abandoned.

[51] Int. Cl.⁵ .................................................. D02G 3/00
[52] U.S. Cl. ...................................... 428/372; 428/392; 428/394; 428/903; 524/584
[58] Field of Search ............... 524/493, 579, 584, 586; 428/372, 392, 394, 903

[56] References Cited

U.S. PATENT DOCUMENTS

| | | | |
|---|---|---|---|
| 3,870,567 | 3/1975 | Palmer et al. | 156/167 |
| 3,985,580 | 10/1976 | Cogliano | 264/211 |
| 4,013,617 | 3/1977 | Gordon et al. | 524/584 |
| 4,110,143 | 8/1978 | Cogliano et al. | 156/167 |
| 4,254,182 | 3/1981 | Yamaguchi et al. | 428/372 |
| 4,422,993 | 12/1983 | Smith et al. | 264/210.8 |
| 4,468,434 | 8/1984 | Sekimoto et al. | 428/372 |
| 4,545,950 | 10/1985 | Motooka et al. | 264/210.6 |
| 4,722,864 | 2/1988 | Matthews | 428/372 |
| 4,758,396 | 7/1988 | Cross et al. | 524/493 |

Primary Examiner—James J. Bell
Attorney, Agent, or Firm—Robert E. Howard

[57] ABSTRACT

Fibers and filaments of an ultra-high-molecular-weight polyolefin that have a void volume greater than about 20% and are wettable. Wettability is imparted to the fibers and filaments by incorporating a filler into the composition that is hydroscopic, has a particle size less than about 10 microns in diameter and a surface area greater than about 30 square meters per gram. The preferred fillers are those that contain surface silanol groups. The fibers and filaments are formed by the process of preparing a mixture of an ultra-high-molecular-weight polyolefin, filler and plasticizer, metering the mixture to an extruder, heating and kneading the blend in the extruder, conveying the extrudate to a fiber or filament forming type die, expressing the extrudate through the die openings to form fibers or filaments, and extracting at least a portion of the extractable plasticizer to provide the desired porosity. The fibers and filaments may be formed into nonwoven webs directly by the melt blown or spun bonded process or by airlaying or wetlaying techniques. Such webs are particularly useful as a battery separator. The filaments may also be woven into fabric.

14 Claims, No Drawings

MICROPOROUS FILAMENTS AND FIBERS

CROSS-REFERENCE TO RELATED APPLICATION

This is a continuation of U.S. patent application Ser. No. 07/368,656, filed June 20, 1989, now abandoned. This application is a continuation-in-part of Ser. No. 07/135,240, filed Dec. 21, 1987, now abandoned.

BACKGROUND OF THE INVENTION

This invention relates to filaments and fibers formed of an ultrahigh molecular weight polyolefin that are microporous and wettable.

By "filament" it is intended to mean an essentially continuous strand of material; by "fiber" it is intended to mean a discontinuous strand of material.

By "strand", within the meaning of this invention, it is intended to mean the product resulting from extruding a molten blend of ultrahigh molecular weight polyolefin, filler, plasticizer and certain minor ingredients through an orifice having a configuration capable of forming a filamentary extrudate, and subsequently extracting all or a part of the plasticizer.

By "microporous" it is intended to mean a filament or fiber that is comprised of a plurality of interconnecting interstices that communicate with the outside and inside of the filament or fiber body, the interstices comprising a void volume of at least twenty percent of said body and preferably at least fifty percent of said body.

By "wettable" it is intended to mean the property of being able to absorb water.

U.S. Pat. No. 4,422,993 discloses spinning solutions of ultrahigh molecular weight polyethylene to form filaments.

U.S. Pat. No. 4,545,950 discloses forming filaments, fibers, etc, by extruding a mixture of ultrahigh molecular weight polyethylene and paraffinic wax, cooling and stretching. The wax may be removed to form a microporous article.

One of the features of this invention is to provide microporous polyolefin filaments and fibers which exhibit good wettability. Polyolefin filaments and fibers are not wettable unless treated. The prior art discloses using wetting agents to impart wettability to polyolefin fibers, such, for example, as disclosed in U.S. Pat. No. 3,870,567; treating nonwoven webs with an aqueous bath comprising water, a surfactant, and colloidal silica such as is disclosed in U.S. Pat. No. 3,985,580; coating nonwoven webs with a hydrophilic vinyl monomer and catalyst such as is disclosed in U.S. Pat. No. 4,110,143; and treatment with corona discharge.

SUMMARY OF THE INVENTION

Filaments and fibers of ultrahigh molecular weight polyolefins are formed that have a void volume of at least twenty percent and are wettable. Wettability is imparted by incorporating a finely divided, hygroscopic filler material into the polyolefin extrusion mixture prior to extrusion.

The filaments and fibers are formed by extruding a mixture consisting essentially of the polyolefin, filler and an extractable plasticizer through an orifice capable of forming a filamentary extrudate, and subsequently extracting at least part of the plasticizer by use of a solvent or nonsolvent for the plasticizer.

DESCRIPTION OF PREFERRED EMBODIMENTS

The polyolefin employed may be any crystalline homopolymer or copolymer of monoolefins having from two to four carbon atoms, i.e., ethylene, propylene and butylene. Preferred are homopolymers of ethylene and propylene, and most preferred are high density polyethylene and substantially isotactic polypropylene homopolymers. The polyolefin should have an ultra-high-molecular-weight ("UHMW"), i.e., a standard load melt index of less than about 0.04 per ten minutes, and preferably 0, when measured in accordance with ASTM D 1238-70, an intrinsic viscosity greater than about 3.0 and, in the case of polyethylene, an inherent viscosity greater than about 5 dl/g (measured in decalin at 135° C.). The preferred UHMW polyethylenes are those having a nominal weight average molecular weight between about 500,000 and about 5 million when measured in accordance with ASTM D 4020-81 and a melt index (MFI) 190/5) less than about 0.01 g/10 min. Minor amounts of lower molecular weight polyolefins may be blended therewith at lower filler loadings. At higher filler loadings it is desirable to use UHMW polyolefins in the higher molecular weight range of those disclosed as useful herein.

It has been found that microporous polyolefin filaments and fibers can be formed which exhibit good wettability by using as a filler admixed with the polyolefin a material which exhibits good affinity for water, i.e., is hygroscopic in nature, and can withstand the temperature and pressure conditions existing in the extrusion process. However, the filler should not be soluble in water to any substantial degree.

Although the term "filler" will be used herein to refer to the major non-polyolefin component of the filaments and fibers of the present invention, it should be noted that there are several important distinctions between the term "filler" as used in the present invention and the term "filler" as generally used in the polymeric fiber and film art. The term "filler" as conventionally used means material added as a reinforcement or as an extender. A reinforcing filler is used to improve mechanical or thermal properties of the polymer. Extenders are used to reduce cost or to improve processability of the polymer. The filler used in the present invention is used primarily to provide enhanced microporosity and wettability to polyolefin filaments and fibers.

More importantly, however, the amount of filler relative to the amount of polymer used in the fibers of the present invention is far greater than the amount of filler material normally used in conventional polymeric filaments and fibers. Typically, fillers added to polymers in forming conventional filaments and fibers are present in amounts, by weight, that are far less than the amount of polymer. In the filaments and fibers of the present invention, the amount of filler is preferably greater than the amount of polymer, i.e., a filler to polyolefin ratio greater than about 1:1, and the amount of filler can be as great as a filler to polyolefin ration of about 20:1, i.e., the filler constitutes about 90% by volume (about 95% by weight) of the filament or fiber. For some uses, the amount of filler may be as high as about 96% by volume of the filament or fiber. The reason why such high filler to polyolefin ratio compositions are able to be formed into filaments and fibers is not completely understood; however, it is known that such high filler loadings cannot be formed into filaments and fibers having desirable strength properties without using an ultra-high-molecular-weight polyolefin as the polymeric component.

The following materials may be used as the filler material in the present invention: carbonaceous materials (e.g., carbon black and graphite); metal oxides and hydroxides, such as those of silicon, aluminum, calcium, magnesium, barium, titanium, iron, zinc, and tin; metal carbonates, such as those of calcium and magnesium; minerals such as mica, montmorillonite, kaolinite, attapulgite, asbestos, talc, diatomaceous earth and vermiculite; synthetic and natural zeolites; portland cement; precipitated metal silicates, such a calcium silicate and aluminum polysilicate; alumina silica gels; glass particles, including microbeads, microspheres, flakes and fibers; and salts, such as molybdenum disulfide, zinc sulfide and barium sulfate.

The preferred filler materials are those that have surface silanol groups, i.e., siliceous fillers, which can hydrogen bond to water, such as silica, mica, montmorillonite, asbestos, talc, diatomaceous earth, vermiculite, synthetic and natural zeolites, portland cement, silicates and polysilicates, alumina silica gels, and glass particles. The preferred siliceous filler is silica, and precipitated silica is the preferred type of silica.

The filler should, desirably, have a high surface area, which means it has either a small particle size or a high degree of porosity (i.e., high surface area or pore volume), or both. The ultimate particle size of the filler can range from an average of about 0.01 micron to about 10 microns in diameter; preferably, the average particle size is less than about 0.1 micron. The surface area of the filler can range from about 30 to about 950 square meters per gram, and preferably is in the range of from about 100 to about 500 square meters per gram. The pore volume is desirably greater than about 0.075 cc per gram, and preferably from about 0.1 to about 0.4 cc per gram.

The surface area and pore volume of the filler can be measured using the nitrogen absorption method described by S. Brunauer, P. J. Emett, and E. Teller in the Journal of American Chemical Society, Vol. 6, page 308 (1938), and commonly known as the BET method.

The preferred plasticizers used in the present invention may serve at least three purposes: they enable ultra-high-molecular-weight polyolefins to be extruded with conventional extrusion equipment by lowering the melt viscosity; they are the component that is at least partially removed after formation of the filaments or fibers to impart porosity to the product; and, where all of the plasticizer is not removed, the amount left in the final product may act in the classical sense of a plasticizer to make the product less brittle. In addition, where the filaments or fibers are formed into a web for use as a battery separator, a small amount of plasticizer left in the filaments or fibers may act to enhance oxidation resistance of the web to the electrolyte in the battery.

Examples of suitable Plasticizers for the present invention are organic esters, such as the sebacates, stearates, adipates, phthalates and citrates; epoxy compounds, such as epoxidized vegetable oil; phosphate esters, such as tricresyl phosphate; hydrocarbon materials such as petroleum oils; and natural oils such as tall oil and linseed oil. The preferred plasticizers are those extractable organic substances that have a solubility parameter close to that of the polyolefin, preferably in the range of from 7.3 to about 8.4. The most preferred plasticizers are petroleum hydrocarbon oils.

Although it is preferred to use a substantially water insoluble plasticizer, the present invention does not exclude the use of a mixture of plasticizers, one of which is water soluble and is substantially removed from the filaments or fibers after formation, so long as the plasticizer that is left in the final product to provide plasticization is substantially water insoluble. Alternatively, a water soluble plasticizer could be used and the filaments or fibers treated with a water insoluble plasticizer after removal of the water soluble plasticizer by extraction where the presence of a plasticizer in the final product is desired. Suitable water soluble plasticizers include ethylene glycol, polyethylene glycol, polypropylene glycol, glycerol, and ethers and esters thereof; alkyl phosphates, such as triethyl phosphate; polyvinyl alcohol; polyacrylic acid and polyvinyl pyrrolidone.

In addition, although it is preferred to use as plasticizers extractable organic substances having a solubility parameter in the range of about 7.3 to about 8.4, extractable organic substances having a solubility parameter greater than 8.4 may be used and extracted, followed by applying a plasticizer having a solubility parameter between about 7.3 to about 8.4 to the filaments or fibers where the presence of such a plasticizer in the final product is desired to perform one of the functions described above.

Other, conventional, additives may be added to the extrusion mixture, such as antioxidants, colorants and lubricants.

The ultra-high-molecular-weight polyolefin component should comprise between about 10 and about 90 percent by volume (between about 5 and 80 percent by weight) of the filaments or fibers, preferably between about 40 and about 60 percent by volume for uses where resistance to rapid wettability of the web formed from the fibers and filaments is desired and preferably between about 10 and about 40 percent by volume where such rapid wettability is desired. For some uses, the amount of UHMW polyolefin may be as low as about 4% by volume.

The filler should comprise between about 10 and about 90 percent by volume of the filaments or fibers, preferably between about 40 and about 60 percent by volume for uses where resistance to rapid wettability of the web formed from the fibers and filaments is desired and preferably between about 60 and about 90 percent by volume where such rapid wettability is desired. For some uses, the filler may be as high as about 96% by volume of the filaments or fibers.

Where one of the product enhancing characteristics imparted to the filaments or fibers by the plasticizer described above is desired, the plasticizer component should comprise between about 1 and about 15 percent by volume of the filaments or fibers, preferably between about 1 and about 10 percent by volume. For many uses however, it may be desirable to remove substantially all of the plasticizer from the filaments or fibers so that there is substantially no plasticizer remaining.

In the process of the present invention, a blend is introduced into the extruder which comprises from about 5 to about 65 percent by volume of the ultrahigh molecular weight polyolefin component, about 5 to about 60 volume percent of the filler component and about 20 to about 80 percent (preferably about 50 to about 80 percent) by volume of the plasticizer component. Other minor conventional additives may be present in the extrusion mixture in amounts recommended by their manufacturers.

Where the plasticizer is a liquid, as, for example, a petroleum hydrocarbon oil, it is preferred to add a portion of the plasticizer to the dry ingredients during mixing, and to add the remainder of the plasticizer directly to a feed port of the extruder together with the "dry" ingredients. The extrusion mixture "dry" components may be mixed prior to introduction to the extrusion operation by any conventional mixing means although it is important that a substantially uniform mixture be obtained. The amount of plasticizer added at the mixing stage should preferably be as much as can be added without losing a somewhat powdery consistency.

It should be noted, however, that it is sometimes convenient to "compound" the extrusion mixture prior to extruding the mixture into fibers or filaments, i.e., to follow the above procedure but extrude the mixture through a compounding die and chopping the resulting strands into pellets. Where the mixture is compounded before fiberizing, all of the plasticizer may be added to the compounded pellets, and when the pellets are metered to a fiberizing extruder/die, no additional plasticizer need be added.

The extrusion mixture is metered to any conventional extrusion device known to be suitable in the art of filament and fiber formation. Screw extruders having two, counter-rotating or co-rotating, screws are preferred. There are a number of manufacturers supplying such devices which come in various sizes dependent upon the throughput of material desired. The heating zones in the extruder barrel are heated to temperatures to obtain the desired degree of plasticization, which depends upon the particular polyolefin selected and the formulation fed to the extruder. For ultrahigh molecular weight polyethylene, it is generally desired to maintain the barrel at temperatures between about 200° and about 250° C.

The output of the extrusion device is fed to a die suitable for forming filaments or fibers, such as a spinneret type die. The optimum temperature of the die depends upon the particular extrusion mixture employed but it is generally preferable to maintain the die at about the same temperature as that of the extruder barrel. Such dies are well known in the art, and may include manifolds on one or both sides of the die orifices for directing a hot gas stream against the extrudate at an angle designed to attenuate the filaments or fibers being extruded. The temperature of such hot gas stream depends upon the polyolefin composition being extruded, and will generally be in the range normally used for conventional polyolefins in the particular filament forming process chosen. In the melt blowing process, for example, air temperatures will generally be about the same as the die temperature.

Alternatively, and especially where continuous filaments are desired, individual filaments or bundles of filaments extruded from the die may be fed into a separate attenuating device employing a heated gas stream to attenuate the filaments.

Attenuation may be accomplished by mechanical tension (e.g., godet rolls) applied to the filaments extruded from the die while the filaments are still at an elevated temperature, or subsequently after the filaments have cooled. It is preferred to perform attenuation of filaments after the filaments have been subjected to the extraction step. Attenuation of filaments tends to make them more supple and improves tensile strength and modulus of elasticity. Attenuation may also increase void volume by introducing stretch induced micropores of the type formed in stretched polyolefin films, such as is described in U.S. Pat. No. 4,359,510. However, for certain uses it may be desirable to omit attenuation.

After filament or fiber formation, the plasticizer is extracted therefrom. The plasticizer may be extracted from the filaments or fibers before or after they are formed into a web. In the melt blown or spun bonded processes where a web is formed directly from the extruded fibers or filaments, the plasticizer is extracted after formation of the web. If two or more plasticizers are employed, multistage extraction may be required, particularly if one plasticizer is water insoluble and one is water soluble.

The solvent chosen to extract the plasticizer depends upon the nature of the plasticizer. Where a petroleum hydrocarbon oil is to be extracted, the following solvents are suitable; chlorinated hydrocarbons, such as trichloroethylene, 1,1,1-trichloroethane, methylene chloride, perchloroethylene, tetrachloroethylene, carbon tetrachloride, etc.; hydrocarbon solvents, such as hexane, benzene, petroleum ether, toluene, cyclohexane, etc.; and chlorofluorocarbons, such as trichlorotrifluoroethane. If a water soluble plasticizer such as polyethylene glycol is to be extracted, suitable solvents include; water; alcohols, such as methanol and ethanol; acetone; etc.

The temperature at which the extraction is carried out can vary from ambient up to the melting point of the polyolefin. The extraction time depends on the extraction temperature, and the time and temperature are chosen so that the desired amount of plasticizer is removed from the filaments or fibers. As mentioned previously, it has been found that for certain uses it is desirable to leave a plasticizing amount of the plasticizer in the final product. Therefore, extraction would be carried out under temperature and time conditions such that the desired amount of the plasticizer is left in the product. Alternatively, although less desirable, all of the plasticizer may be removed and the desired amount added to the filaments or fibers in a subsequent treatment step. The particular means employed to carry out the extraction is not part of the present invention. The extraction may be carried out on a batch basis or on a continuous basis by passing the filaments or fibers, or a web formed therefrom, through a liquid and/or vapor bath of the extraction media, generally in a countercurrent extraction manner. The extraction media and the plasticizer may then be separated and recovered by distillation or other suitable separation means.

It has been found desirable to dry the extracted fibers or filaments, or webs formed therefrom, at an elevated temperature after plasticizer extraction. Subjecting the extracted fibers, filaments or webs to an elevated temperature appears to aid in developing enhanced wettability. Temperatures between about 212° F. to about 280° F. are useful in this regard.

The fibers of the present invention may be formed by conventional fiber forming techniques known in the art. For example, fibers may be formed by melt blowing in which the compositions disclosed herein are fed to an extruder for plasticization, the extrudate from the extruder fed to a spinneret type die head containing a plurality of small die openings, and feeding the material from the die openings into a gas stream to attenuate the extrudate and form the fibers. The fibers may be collected upon a moving foraminous collection device as a mat. Suitable devices are described in U.S. Pat. No. 3,650,866 and U.S. Pat. No. 3,947,537.

Filaments may be formed by extruding the extrudate through a die orifice of a suitable type, such as a spinneret type die or, in the case of monofilaments, through a plate containing many small holes, and attenuating the filaments by conventional mechanical or pneumatic means either while the filaments are in a heated state or after cooling, and preferably after extraction. One such process of forming continuous filaments is described in U.S. Pat. No. 3,692,618. The filaments may, if desired, be chopped into staple fibers to provide fibers having a larger diameter than is usually formed by melt blowing.

The filaments and fibers of the present invention have a void volume greater than about 20%, preferably greater than about 50%, and as high as about 80% to about 95%. Void volume is determined by removing the plasticizer by solvent extraction and determining the amount of extracted oil that was present in the filaments or fibers.

The average pore diameter of the pores in the fibers and filaments of the present invention is less than about 1.0 micron, and at least about 90% of the pores have a pore diameter of less than about 0.5 micron. The average pore diameter can range down to about 0.1 micron or less. Pore diameter is measured by conventional mercury intrusion techniques. The pores or porosity of the fibers and filaments of this invention are sometimes referred to herein as "micropores" or "microporosity" and the pores or porosity created by the interfiber or interfilament interstices of woven or nonwoven sheets made from them referred to as "macropores" or "macroporosity".

For fibers formed by the melt blowing process, the average diameter is less than 10 microns, and generally ranges between about 1 and about 10 microns.

The "coarseness" of the fibers of the present invention is less than 1 decigrex, and generally less than about 0.5 decigrex. By comparison, ordinary polyolefin melt blown fibers have a coarseness greater than 1 decigrex. Generally speaking, the coarseness of the fibers of the present invention will be approximately 20% to about 50% that of a nonporous fibers of corresponding dimensions, depending upon the void volume. "Coarseness" is measured by TAPPI Method No. T234 SU-67; the decigrex unit is measured as weight of fibers in milligrams per 100 meters of the fibers.

The fibers of the present invention may be used to form nonwoven webs directly as part of the melt blown process as, for example, described in U.S. Pat. No. 3,947,537. The nonwoven webs thus formed may be calendered, either before and/or after plasticizer extraction, to control the thickness and porosity of the web to desired levels. Alternatively, nonwoven webs can be formed in a separate operation by conventional airlaying techniques either with adhesives to enhance fiber to fiber bonding or by heating and/or pressing such webs to cause fiber to fiber bonding.

The fibers may also be formed into webs by the wetlaid processes used in cellulosic paper manufacture. The fibers, being wettable, can be formed into a web either alone or in admixture with cellulosic fibers, or other fibers conventionally formed into webs by the wetlaid process, such as glass fibers, synthetic pulp, synthetic polymeric fibers, etc. Although the fibers of the present invention are wettable, they are hydrophobic at lower filler loadings and it is, therefore, desirable to employ a dispersing agent to aid in the uniform dispersion of such fibers in aqueous slurries. Suitable dispersing agents include anionic surfactants, such as alkali salts of higher fatty acids, alkylsulfonic acid salts, alkylaryl sulfonate salts and sulfosuccinate ester salts. As an additive to cellulosic fibers, the fibers of the present invention enhance optical properties, such as brightness and opacity, of paper formed from such a blend. Such paper has enhanced printability with inks of all types (including water-based, oil-based and organic solvent-based), particularly where the fibers of the present invention constitute all or a substantial portion of the fibers in the paper web. The present fibers also impart water resistance to such paper webs at lower filler loadings, as discussed above.

Webs formed from fibers of the present invention, whether formed directly (such as by the melt blown or spun bonded processes), or by an airlaid or wetlaid technique, and whether or not they are mixed with cellulosic or other types of fibers, exhibit enhanced printability with inks of all types. Such webs are either water resistant (where the fibers of the present invention are present as the sole or major portion of the total fiber content and have lower filler loadings) or exhibit enhanced water resistance (where the fibers are present to a lesser extent and have lower filler loadings). Such webs are rapidly wettable where the fibers have a higher filler loading, as discussed above.

The continuous filaments of the present invention may be formed into spunbonded webs by forming a web of the filaments ranging from less than about 0.5 to about 10 microns in thickness and bonding under heat and pressure by conventional techniques, such as those used to form Tyvek (trademark of E. I. Dupont) or used in the Docan process (Lurgi Mineroltechnik GmbH).

The continuous filaments of the present invention may also be woven into fabric webs by conventional weaving techniques.

Whether the continuous filaments are formed into webs by the spunbonded or similar techniques, or woven into fabrics, they offer the same advantage relative to dyeability discussed above relative to nonwoven webs. Prior art polyolefin filaments are not easily dyeable, and generally colorants are added to the extrusion mixture prior to formation of filaments. The filaments of the present invention are dyeable with a wide variety of conventional dyes normally used with natural or other dyeable synthetic filaments. The dyeability of the filaments of the present invention can be tailored to individual dye systems by adjusting the amount of filler loading to provide optimum surface tension of the web relative to the dye selected.

Although generally formed in dies having round or oval orifices in cross-section, the fibers and filaments of the present invention may be formed in dies whose orifices have almost any cross-sectional shape, including those designed to form hollow filaments or fibers. Although the morphology of the filaments or fibers of the present invention has not been studied in great detail, electron microphotographs at magnifications up to 8,000 X show that the fibers have an extremely rough, porous surface.

The fibers and filaments of the present invention may be used for any use to which fibers and filaments of other materials are currently used. Because of their porosity, they form articles of lighter weight than similar, solid fibers or filaments. This property, together with the properties of water resistance at lower filler loadings and excellent dyeability, makes woven and nonwoven fabrics and webs made therefrom particularly useful for tenting and clothing. The fibers and filaments of the present invention, and fabrics and webs made therefrom, also make excellent filter media, and can also be used as the substrate for timed release of pharmaceuticals, agricultural and other chemicals.

A particularly good use for the woven and nonwoven webs made from the filaments and fibers of the present invention are as battery separators. It is known to make battery separators from nonwoven webs of polyolefins, such as is disclosed in U.S. Pat. No. 3,870,567, and it is known to make battery separators from microporous sheets, such as is disclosed in U.S. Pat. No. 3,351,495. However, it was not known before the present invention to form battery separators of fibers or filaments that were microporous and wettable without the aid of surfactants.

The use of microporous filaments or fibers that are wettable to form the battery separator provides greatly enhanced ability to absorb electrolyte over prior nonwoven web type separators or over prior microporous sheet separators. This is due to the fact that separators formed of the filaments or fibers of this invention exhibit both microporosity and macroporosity. This property is particularly useful in forming "starved electrolyte" (recombinant) type batteries where the ability of the separator to absorb and retain electrolyte is critical since the only electrolyte present is that absorbed by the separator and plate.

The woven or nonwoven webs may be used as separators by themselves or attached to another separator material, such as the sheet type separator disclosed in U.S. Pat. No. 3,351,495. Such nonwoven web laminates permit the use of much thinner sheet separators to which the nonwoven web is attached (such as the sheet separator of the aforementioned '495 patent) since the nonwoven web acts as a reinforcing layer. Alternatively, one or both surfaces of a web formed from the filaments or fibers of the present invention may be wholly or partially fused by heat and/or pressure to form a film-like surface.

The separators of the present invention may be substituted for glass fiber type separators currently used in both flooded cell and starved electrolyte batteries, such as those disclosed in numerous issued patents as, for example, U.S. Patent No's 4,072,802, 4,153,759, 4,414,295 etc., and are superior to such glass fiber separators due to the microporosity of the fibers and filaments of the present invention and the more favorable economics of being able to form the separator web at less energy cost and a web that weighs less than an identically sized glass fiber web.

It is preferred to make the separators from the fibers and filaments of this invention at thicknesses of less than about 15 mils, and preferably from about 1 to about 10 mils for use in flooded cell type batteries. For starved electrolyte type batteries, and certain flooded cell type batteries, the thickness of the separator is usually greater, preferably between about 15 and about 120 mils. Such separators exhibit an electrical resistance of less than about 1.5 milliohms per square inch per mil thickness.

The following examples illustrate specific ways of practicing the present invention, but are not to be construed as limiting the scope of the invention;

EXAMPLE 1

A mixture containing 37 pounds of ultrahigh molecular weight polyethylene (Himont 1900 UHMW Polymer), 137 pounds of hydrated, amorphous silica (Hi-Sil 233 manufactured by PPG Industries), 0.6 pounds of Irganox B 215 (an antioxidant/stabilizer manufactured by Ciba-Geigy), and 0.6 pounds of Petrac CZ-81 (a lubricant manufactured by Desoto, Inc.) is thoroughly blended in a Littleford high intensity mixer for 2 minutes. To the mixer was added 27 gallons of Shellflex 412 ( a petroleum hydrocarbon oil manufactured by Shell Oil Company) at a temperature of about 125° F., and the resulting mixture blended for an additional five minutes. The resulting mixed blend is placed into a Marion continuous blender and blended until fed to the extruder. The blend is metered to the feed port of a Leistritz Model ZSE 96 extruder at the rate of 450 pounds per hour. At the same time, Shellflex 412 is continuously metered into the feed port of the extruder at the rate of 50 pounds per hour. The barrel is heated to a temperature of 220° C. The extrudate is fed to a die having the design disclosed in U.S. Pat. No. 3,947,537 maintained at a temperature of 220° C. Hot air (600° F.) is fed into the manifold surrounding the die holes at a rate that provides good fiber formation. The fibers thus formed are collected on a rotary screen located 24 inches from the die. A representative sample weighing 100 grams of the collected fibers is placed into the 12 liter flask of a Soxhlet extractor containing 6 liters of 1,1,1-trichloroethane and extracted for 15 minutes at 72° C. The extracted fibers have a void volume of approximately 60%.

EXAMPLE 2

A hand sheet is prepared from the fibers of Example 1 in accordance with TAPPI T205 m-58. The resulting handsheet exhibits good formation, is very white in appearance and holds together nicely.

EXAMPLE 3

The procedure of Example 1 using the same composition is repeated except that the heated air to the manifolds is turned off. The continuous filaments of extrudate thus formed are allowed to cool. Several lengths of filaments approximately one meter in length are cut and extracted in a Soxhlet extractor as in Example 1. After extraction, the filaments are stretched (attenuated) to a length of approximately two meters. The diameter is reduced as a result of this stretching and very white continuous filaments are obtained which are wettable.

EXAMPLE 4

Example 1 is repeated except that the collector is located approximately 10 inches from the die. The resulting mat is cut into a sheet approximately 6×6 inches in size. The sheet is extracted in a Soxhlet extractor as in Example 1. The extracted sheet is placed between two plates of a press approximately 10×10 inches in size at a plate temperature of about 280° F. The plates are compressed to a gap of about 10 mils and kept closed for about 20 seconds. The resulting nonwoven web is white in appearance and is wettable.

EXAMPLE 5

The nonwoven web of Example 4 is measured for electrical resistance in a Palico tester involving a ten minute soak in boiling (100° C.) water and a twenty minute soak in 1.280 specific gravity sulfuric acid at 26° C. The electrical resistance is 10 milliohms per square inch.

EXAMPLE 6

A mixture containing 3.3 pounds of ultrahigh molecular weight polyethylene (Himont 1900 UHMW Polymer), 11.5 pounds of hydrated, amorphous silica (Hi-Sil 233 manufactured by PPG Industries), 0.06 pounds of Irganox B 215 (an antioxidant/stabilizer manufactured by Ciba-Geigy), and 0.06 pounds of Petrac CZ-81 (a lubricant manufactured by Desoto, Inc.) was thoroughly blended in a Littleford high intensity mixer for 2 minutes. To the mixer was added 3.8 gallons of Shellflex 412 (a petroleum hydrocarbon oil manufactured by Shell Oil Company) at a temperature of about 70° F., and the resulting mixture blended for an additional five minutes. The blend was metered to the first feed port of a Betol Model BTS 40 extruder at the rate of 31 grams per minute. At the same time, Shellflex 412 was continuously metered into the second feed port of the extruder at the rate of 11 grams per minute. The barrel was heated to temperatures of 195° C. to 240° C. The extrudate is fed to a die having the design disclosed in U.S. Pat. No. 3,947,537. The nosepiece of the die was ten inches in length and had 100 holes each of which had a diameter of 0.025 inch. The die was maintained at a temperature of 236° C. to 315° C. Hot air at 315° C. is fed into the manifold surrounding the die holes at a rate that provides good fiber formation. The fibers thus formed are collected on a rotary screen located approximately 36 inches from the die. A representative sample weighing 100 grams of the collected fibers is placed into a 12 liter flask of a Soxhlet extractor containing 6 liters of 1,1,1 - trichloroethane and extracted for 15 minutes at 72° C. The extracted fibers have a void volume of approximately 60%.

EXAMPLE 7

A number of blends having the percent by weight compositions set forth below were prepared;

| Example | Polyethylene[1] | Silica[2] | Oil[3] | Other[4] |
|---------|-----------------|-----------|--------|----------|
| 7A | 7.6% | 30.4% | 61.9% | 0.3% |
| 7B | 4.2% | 33.7% | 61.9% | 0.3% |
| 7C | 3.4% | 34.4% | 61.9% | 0.3% |
| 7D | 2.9% | 34.9% | 61.9% | 0.3% |
| 7E | 2.5% | 35.3% | 61.9% | 0.3% |

Footnotes:
[1]7A: Hoechst 7255; 7B-7D: Hoechst 412; 7E: Hoechst 413
[2]PPG 86-C (Note: Percent by weight based upon ambient, not bone dry weight.)
[3]Shellflex 412
[4]Irganox B 215 and Petrac CZ-81 (0.15% each)

Each of these blends was metered into the first feed port of a Betol Model BTS 40 twin screw (co-rotating) extruder at the rate of approximately 38 grams per minute. At the same time, Shellflex 412 at room temperature was continuously metered into the second feed port of the extruder at the rate of 13 grams per minute. The extruder barrel was heated to temperatures of 160° C. to 270° C. The extrudate from the extruder was fed to a die having the design disclosed in U.S. Pat. No. 3,947,537. The nosepiece of the die was ten inches in length and had 200 holes each having a diameter of 0.015 inch. The die was maintained at a temperature of 260° C. Hot air at a temperature of 260° C. was fed into the manifold surrounding the die holes at a pressure in the manifold of 10 psi. The fibers were blown onto a rotary collector and formed into nonwoven webs. Samples of the webs were extracted with 1,1,1-trichloroethane to remove substantially all of the oil and dried in an oven at 270° F. for one hour. The webs all had good strength and were white in appearance.

EXAMPLE 8

The webs prepared in example 7 were tested for wettability, as follows; Aqueous solutions of methanol were prepared at concentrations between 5% and 45% by weight. One hypodermic syringe was filled with each concentration. Starting with the webs formed from fibers with the lowest filler loading, a drop of water and a drops of the 45%, 40% and 35% solutions (at room temperature, 68° F.) were placed on each of the webs to determine if it immediately soaked in or formed a ball on the web surface. (It was found that the 40% methanol solution wet all webs, regardless of filler loading.) The results were as follows;

| Example No. | Water Wets? | Lowest Methanol Wetting (%) |
|-------------|-------------|------------------------------|
| 7A | No | 40% |
| 7B | No | 30% |
| 7C | No | 20% |
| 7D | No | 10% |
| 7E | Yes | 0% |

It can be seen from the foregoing that as the filler loading was increased the webs became more wettable until, at a filler loading of 35.3% by weight (20% by volume) (silica to polymer weight ratio of 14:1) the webs readily wet with water. The methanol concentration at which the webs wet may be correlated to the surface tension of the web, and, thus, webs may be designed to have a surface tension (degree of wettability) to whatever extent it is desired.

EXAMPLE 9

Example 7A was repeated using a number of different silicas substituted for that used in the example. The silicas used were;

| Example | Silica | Manufacturer |
|---------|--------|--------------|
| 9A | VN3 SP | Degussa |
| 9B | Cab-O-Sil S-17 | Cabot |
| 9C | LO-VE2 | PPG |
| 9D | Aerosil OX 50 | Degussa |
| 9E | Aerosil 380 | Degussa |

The extracted webs were strong and white in appearance.

We claim:

1. Fibers or filaments comprised of about 4% to about 90% by volume of an ultra-high-molecular-weight polyolefin selected from the group consisting of homopolymers and copolymers of ethylene, propylene and butylene; about 10% to about 96% by volume of a hygroscopic filler having a particle size less than about 10 microns; said fibers or filaments having a void volume greater than about 20%.

2. The fibers or filaments of claim 1 which additionally contain between about 1% and about 15% by volume of a plasticizer.

3. The fibers or filaments of claim 2 wherein the plasticizer has a solubility parameter between about 7.3 and about 8.4.

4. The fibers or filaments of claim 2 wherein the plasticizer is a petroleum hydrocarbon oil.

5. The fibers or filaments of claim 1 wherein the filler is a material having surface silanol groups.

6. The fibers or filaments of claim 5 wherein the filler is silica.

7. The fibers or filaments of claim 1 wherein the filler has a surface area greater than about 30 m$^2$/gram.

8. The fibers or filaments of claim 1 wherein the polyolefin is polyethylene having an inherent viscosity greater than about 5 dl/gram.

9. The fibers or filaments of claim 1 wherein the polyolefin is polyethylene having a nominal weight average molecular weight greater than about 300,000.

10. The fibers or filaments of claim 1 wherein the polyolefin is polyethylene having a nominal weight average molecular weight between about 300,000 and about 5 million.

11. Microporous fibers or filaments comprised of about 4% to about 90% by volume of an ultra-high-molecular-weight polyolefin selected from the group consisting of homopolymers and copolymers of ethylene, propylene and butylene; about 10% to about 96% by volume of a hygroscopic filler having a particle size less than about 10 microns; said fibers or filaments being microporous due to a plurality of interconnecting interstices that communicate with the outside and inside of the filament or fiber body, the interstices comprising a void volume greater than about 20% of said body.

12. The fibers or filaments of claim 1 or claim 11 wherein the ratio of filler to polyolefin is between about 1:1 and about 20:1.

13. The fibers or filaments of claim 1 or claim 11 wherein the filler comprises between about 60% and about 96% by volume.

14. The fibers or filaments of claim 1 or claim 11 having an average diameter between about 1 and about 10 microns.

* * * * *